UNITED STATES PATENT OFFICE.

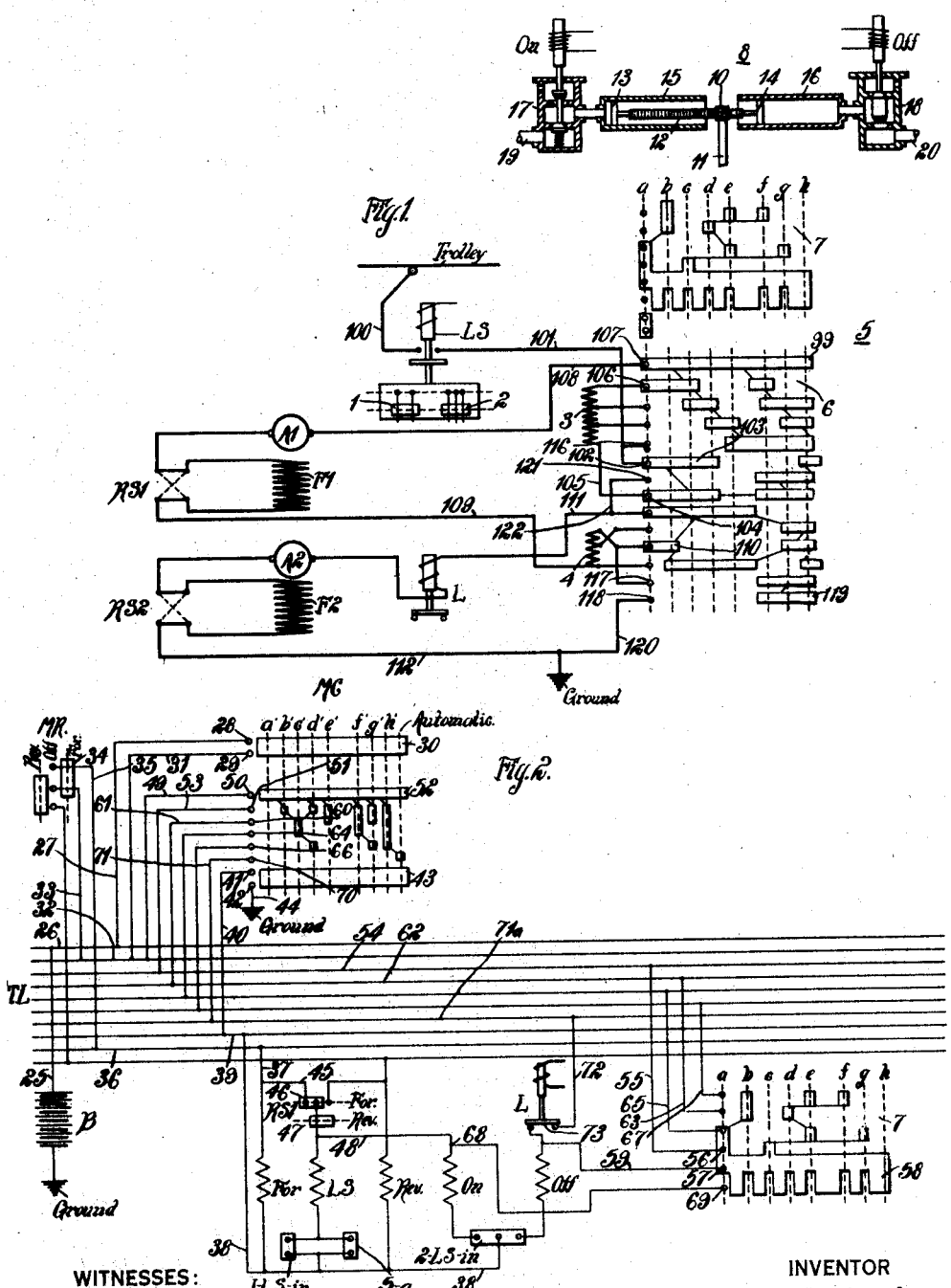

PAUL L. MARDIS, OF SWISSVALE, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

1,387,503.

Specification of Letters Patent.   Patented Aug. 16, 1921.

Application filed October 17, 1918. Serial No. 258,539.

*To all whom it may concern:*

Be it known that I, PAUL L. MARDIS, a citizen of the United States, and a resident of Swissvale, in the county of Allegheny and State of Pennsylvania, have invented a new and useful Improvement in Systems of Control, of which the following is a specification.

My invention relates to systems of control and particularly to that type of railway-motor control whereby selective manual and automatic operation may be effected.

One object of my invention is to provide a system of the above-indicated character wherein control means is provided to independently effect a manual step-by-step operation and full automatic operation of the machine to be governed or for automatically effecting a similar normal operation to any selected step.

In another aspect, the object of my invention is to accomplish the above-stated result by the use of a master controller embodying a materially smaller number of "progression" control conductors than of operative steps or positions of the main circuit-adjusting controller.

More specifically stated, it is one object of my invention to provide, in a system of the class under consideration, a master controller for effecting acceleration of one or more motors step-by-step as the controller occupies successive positions or for automatically effecting a complete normal acceleration when the controller is rapidly actuated through said successive positions to a final position.

Viewed from another angle, it is an important object of the present invention to not only provide a system permitting full automatic acceleration under the control of the familiar limit switch, when desired, but also to allow automatic operation in a different sense and entirely independent of the limit switch, to any selected operating step.

My invention may best be understood by reference to the accompanying drawing, wherein Figure 1 is a diagrammatic view of the main circuits, including a circuit adjusting controller, that may be employed in carrying out my invention; and Fig. 2 is a diagrammatic view of auxiliary governing circuits for manipulating the main controller of Fig. 1 in the desired manner.

Referring to Fig. 1 of the drawing, the system here shown comprises suitable supply-circuit conductors respectively marked "Trolley" and "Ground"; a plurality of main dynamo-electric machines respectively having armatures A1 and A2 and series-type field winding F1 and F2, which may be reversed in the customary manner by suitable reversing switches RS1 and RS2 (illustrated in a conventional manner); a line switch LS for closing the main circuit and embodying a plurality of auxiliary-circuit or inter-lock contact members 1 and 2, of a familiar type, for a purpose to be described in connection with Fig. 2; a plurality of variable resistors 3 and 4 for use in effecting gradual acceleration of the machines; a main controller 5 for varying the resistors and, in general, for adjusting the main circuits; and a limit switch L, of a familiar type, for effecting full automatic operation of the system under predetermined conditions, as hereinafter more fully described.

The main circuit-adjusting controller 5 is preferably of the familiar drum type and comprises a main-circuit section 6 and an auxiliary circuit or interlocking section 7, the controller, as a unit, being actuated through its successive positions $a$ to $h$, inclusive, through the agency of an operating mechanism 8.

The mechanism 8 is of a familiar electrically controlled, pneumatically-operated type, comprising a pinion 10 which is rigidly secured to the actuating shaft 11 of the controller 5 and which meshes with a rack member 12, the opposite ends of which constitute pistons 13 and 14, traveling within suitable operating cylinders 15 and 16, respectively. A normally closed valve member 17 is associated with the outer end of the cylinder 15, while a normally open valve member 18 communicates with the outer end of the other cylinder 16. Fluid pressure from any suitable source is supplied through pipes or passages 19 and 20 to the respective valve members 17 and 18, which are also provided with suitable actuating coils, respectively marked "On" and "Off."

Assuming that the parts of the operating mechanism occupy the illustrated normal positions, the mechanical operation thereof, without regard to the electrical connections effected thereby, may be set forth as follows. Since the valve member 18 is normally open, fluid pressure is initially present in the cylinder 16 to bias the mechanism and, consequently, the main controller 5, to its initial position $a$. Upon energization of both the actuating coils On and Off, the initially unbalanced fluid-pressure conditions are reversed; that is, fluid pressure is admitted through the open valve member 17 to the cylinder 15 and is exhausted from the cylinder 16, through the closed valve member 18, to the atmosphere. Consequently, movement of the piston members toward the right and actuation of the controller 5 toward the left, through its successive positions, are effected.

To arrest such movement at any time, it is merely necessary to deënergize the Off coil, whereby the fluid pressure is again admitted to the cylinder 16 to effect balanced-pressure conditions in the operating mechanism, thus insuring positive and reliable stoppage thereof. To return the controller 5 to its normal illustrated position, the two actuating coils are concurrently deënergized, whereupon fluid-pressure conditions in the mechanism 8 revert to the original state, and the desired backward movement of the controller is effected.

The auxiliary governing system shown in Fig. 2 comprises the actuating coils and auxiliary contact members of the line switch LS, the limit switch L and the controller 5, together with a master controller MC having a plurality of operative positions $a'$ to $h'$, inclusive, (for manually governing the motor operation), and a final operative position designated as "Automatic" for effecting the operation that the title indicates; a master reverser MR of a familiar type; a plurality of train-line conductors TL, whereby the present system may be readily adapted for multiple-unit operation; and a suitable source of energy, such as a battery B, for energizing the various actuating coils in accordance with the actuation of the master controller.

Assuming that it is desired to effect manual step-by-step operation of the main controller 5 and, therefore, of the illustrated electric motors, the master controller MR is first actuated to its "forward" position, for example, and the master controller MC is then moved to its initial operative position $a'$. A circuit is thereby established from one terminal of the battery B, through conductor 25, train-line conductor 26, conductor 27, control fingers 28 and 29, which are bridged by contact segment 30 of the master controller, conductor 31, train-line conductor 32, conductor 33, contact segment 34 of the master reverser in its "forward" position, conductor 35, train-line conductor 36, conductor 37, actuating coil "For." of the main reversing switch, conductor 38, train-line conductors 39, conductor 40, control fingers 41 and 42 which are bridged by contact segment 43 of the master controller, and conductor 44 to ground, the opposite terminal of the battery B being also connected to ground to thus complete the auxiliary energizing circuit. In this way, the main reversing switches RS1 and RS2, which are preferably mounted on a drum of a familiar electrically-controlled type, are actuated to their forward running positions, in case they do not already occupy such positions.

A branch circuit is then completed from conductor 37, through conductor 45, contact member 46 of the main reversing switch, in its forward position, conductor 47, actuating coil of the line switch LS, contact member 5—$a$ of the main controller, in its initial position, and thence, through conductor 38, to the negative battery terminal. A further branch circuit is continued from the conductor 47, through conductor 48, actuating coil On of the main controller 5, and interlock 2—LS-in as soon as the line switch is closed, to the negative conductor 38. Furthermore, a holding circuit for the line switch LS is formed upon the closure thereof by the bridging of a second interlock 1—LS-in across the contact member 5—$a$.

The initial main circuit, completed by the closure of the line switch LS, may be traced as follows: from the trolley through conductor 100, switch LS, conductor 101, control finger 102, contact segment 103, and control finger 104 of the main controller section 6, conductor 105, the entire accelerating resistor 3, control fingers 106 and 107, which are bridged by a second contact segment 99 of the master controller, conductor 108, armature A1, field winding F1, conductor 109, the entire accelerating resistor 4, suitable control fingers, which engage a third contact segment 110 of the main controller, conductor 111, actuating coil of the limit switch L, armature A2, field winding F2 and conductor 112 to ground.

Referring again to Fig. 2, upon actuation of the master controller to its second operative position $b'$, a new circuit is established from the positively-energized train-line conductor 32, through conductor 49, control fingers 50 and 51, which are bridged by contact segment 52 of the master controller, conductor 53, train-line conductor 54, conductor 55, control fingers 56 and 57, which are bridged by contact segment 58 of the auxiliary or interlock section 7 of the main controller, conductor 59, the actuating coil Off, and interlock 2—LS-in to the negative conductor 38.

Since the actuating coils On and Off of the main controller 5 are thus both energized, movement of the controller to its second position *b* will occur. However, such movement is arrested in this position by reason of the disengagement of control finger 56 from the contact segment 58 of the interlock drum 7, thereby deënergizing the off coil and stopping the controller, in accordance with previously explained principles.

Upon movement of the master controller to its position *c'*, two new control fingers 60 and 64 engage the contact segment 52, circuit being continued from the control finger 60 through conductor 61, train-line conductor 62, conductor 63 and contact segment 58 of the main controller 5 in its position *b*, to the off coil, as previously traced, thus causing the main controller to advance one more step, namely, to position *c*, wherein the circuit just traced is broken at the interlock drum 7.

Control finger 64 and its attendant circuits are not employed during straight manual operation of the system but are employed for a novel purpose during selective automatic acceleration of the motors independent of the limit switch, as hereinafter more fully set forth.

In position *d'* of the master controller, a circuit is continued from the contact segment 52, again through control finger 51 and the interlock drum segment 58 to the off coil to cause the main controller to assume its position *d*. A new control finger 66 is also energized in this position of the master controller but is employed only during selective automatic operation, thus corresponding to the above-described control circuit, including finger 64.

In position *e'* of the master controller, fingers 51 and 60 are again energized but only the finger 60 is employed under manual accelerating conditions to again complete the circuit of the actuating coil Off and to cause the actuation of the main controller to its corresponding position *e*.

Referring temporarily to Fig. 1, it will be noted that the previously-described movement of the main controller to position *b* causes the short-circuit of the accelerating resistor 4 by contact segment 110 and that the three sections of the accelerating resistor 3 are successively short-circuited in positions *c*, *d* and *e* by the contact segment 99, thus effecting acceleration of the motors to the full-series condition corresponding to position *e* of the main controller and position *e'* of the master controller. At this time, the motor circuit is continued from line switch LS through conductor 101, control finger 116, contact segment 99, control finger 107, conductor 108, thence through the first motor to conductor 109, and contact segment 110 of the main controller, which serves to directly connect conductors 109 and 111, circuit being thence completed through the second motor to ground, as previously traced.

To effect the transition from series to parallel relation of the electric motors, the master controller is actuated to its position *f'*, whereby control fingers 51, 60 and 64 are energized, circuit being continued from control finger 64, conductor 65 and the interlock drum contact segment 58 to the off coil. The main controller 5 is thus actuated to its initial parallel position *f*.

One of the main circuits established by this movement of the main controller 5 may be traced from the line switch LS through conductor 101, control finger 116, contact segment 99, control finger 107, through the first motor to the lower terminal of accelerating resistor 4, circuit being completed from the other terminal thereof through control fingers 117 and 118, which are bridged by another contact segment 119 of the main controller, and conductor 120 to ground. A similar circuit is completed from the contact segment 99 through control finger 106, two sections of the accelerating resistor 3, conductor 105, control fingers 104 and 121, which are bridged by contact segment 103, conductors 122 and 111 and thence through the second motor to ground. The two electric motors are thus connected in parallel relation with the accelerating resistors 4 and 3 in circuit with the armatures A1 and A2, respectively.

By actuating the master controller to its next position *g'*, control fingers 51, 60 and 66 are energized, an active circuit being continued from control finger 66 and conductor 67 to contact segment 58 of the interlock drum 7 to cause another forward step of the main controller, namely, to position *g*.

In the final manual accelerating position *h'*, of the master controller, control fingers 51, 60, 64 and 66 are all energized, an active circuit being continued from control finger 64 through conductors 65 and interlock drum contact segment 58, whereby the main controller 5 is moved to its final position *h*.

Upon an inspection of Fig. 1, it will be observed that, in positions *f*, *g* and *h* of the main controller, the three sections of the accelerating resistor 3 are successively short-circuited, the entire resistor being employed during the transitional period only, whereas the other accelerating resistor 4 is short-circuited in two steps by the contact segment 110. The one main circuit is, therefore, established in position *h* of the main controller, from the line switch LS through conductor 101, control fingers 116 and 107, which are bridged by contact segment 99, conductor 108, through the first motor to contact segment 110 and thence, through contact segment 119, to ground. The circuit of the other motor is completed from conductor 101, through control fingers 102 and 121, which are bridged by contact segment 103, conductors 122 and 111 and thence, through the motor, to ground, as previously traced.

The above description is complete with respect to the manual step-by-step acceleration of the motors. If a similar normal operation of the system is desired under full automatic control, with the accompanying well-known advantages, such action may be readily accomplished by rapidly rotating the master controller through the positions $a'$ to $h'$ to its final position marked "Automatic." The energizing circuits for the actuating coils of the line switch LS and of the valve member 17 for the operating mechanism 8 are completed in accordance with the previously traced circuits, but a new circuit for the off coil is established from the master-controller contact segment 52, through control finger 70, conductor 71, train-line conductor 71a, conductor 72, auxiliary contact member 73 of the limit switch L in its lower or normal position, and thence, through the actuating coil Off, to the negative conductor 38. In this way, the main controller 5 is advanced one step whenever the limit switch L drops to its circuit-closing position. Such movement increases the main motor current sufficiently to cause the limit switch L to rise to its open-circuit position and thus effect the stoppage of the main controller in the position just reached, until the main motor current against decreases to a degree allowing the limit switch L to resume its lower circuit-closing position. Since this action is old in the art, no further detailed description of the operation of the main controller and the limit switch is believed to be necessary. It should be noted, however, that full automatic operation is effected entirely independently of the "progression" control conductors, namely, those connected to fingers 51, 60, 64 and 66 of the master controller. These conductors, on the other hand, are employed independently of the limit switch in the novel type of selective automatic acceleration that is described below.

In order to insure that the main controller 5 will not stick in any position intermediate the desired control notches, even though the distance between them is considerable, I have shown a "spot contact" method for eliminating any such possibility. The additional construction involves merely a conductor 68, which is connected to the conductor 48 and terminates in control finger 69, which engages the contact segment 58 of the interlock drum for certain distances intermediate the controller positions only. Consequently, if the main controller should tend to stick in such an intermediate position, the circuit of the off coil would continue to be energized, irrespective of the relative location of the remaining control fingers with regard to the contact segment 58, and irrespective of the position of the limit switch L, since the desired circuit is continued from the positively-energized conductor 68 through control fingers 69 and 57, which are bridged by the contact segment 58 in such intermediate positions, and conductor 59 to the actuating coil Off.

In addition to, and independently of, the fully automatic action described above, the present invention involves the desirable feature of permitting a different type of automatic acceleration to a point corresponding to any selected step of the master controller, and such selective automatic action, moreover, whereby seven main controller steps are employed, is effected by the use of only four "progression" control conductors, namely, those connected with the control fingers 51, 60, 64 and 66, in a manner about to be explained.

One advantage of such automatic action, independent of the limit switch, resides in the possibility of maintaining a desired schedule of car operation when traveling in hilly districts, irrespective of the fact that the limit switch will stay up because of the heavy current that is drawn. Various schemes have been proposed to obviate this difficulty, but the present arrangement is much more reliable and satisfactory in general.

Direct initial movement of the master controller to position $b'$ will accomplish the same results as those already set forth in connection with the manual control of the acceleration. Similar direct movement to position $c'$, in addition to energizing the line switch LS and the on coil, effects the energization of control fingers 60 and 64. By reason of the energization of finger 64, the circuit of the off coil is completed through conductor 65 and the contact segment 58 of the interlock drum until position $b$ is reached, wherein the conductor 65 is no longer active. However, in this position, conductor 63, which is connected to control finger 51, becomes active to reënergize the off coil and thus effect movement of the main controller to position $c$.

Upon direct movement of the master controller to position $d'$, the "progression" control fingers 51 and 66 are energized, thus effecting the automatic step-by-step movement of the main controller to position $d$ through the successive agency of conductors 55, 67, and 55 again, as will be understood from inspection of the interlock drum contact segment in Fig. 2 without further detailed description.

Direct actuation of the master controller to position $e'$ energizes the "progression"

control fingers 51 and 60, whereby the desired step-by-step movement of the main controller is effected through the medium of the successive utilization of conductors 55 and 63 and a repetition of such use.

If the master controller is moved directly to its initial parallel position $f'$, control fingers 51, 60 and 64 are all energized, whereby actuation of the main controller to position $e$ is accomplished, as just explained, and the final step to position $f$ is effected through the circuit including conductor 65.

Direct rotation of the master controller to position $g'$ again effects movement of the main controller 5 to position $e$ in the manner set forth above, while the remaining steps to positions $f$ and $g$, respectively, are caused by the active energization of conductor 67 twice in succession.

Throwing the master controller directly to its position $h'$ energizes all four of the "progression" control fingers, whereby the main controller is actuated to position $g$ in the step-by-step manner just described for that position, while the final step to position $h$ is accomplished through the agency of conductor 65.

It will be seen that I have thus provided a control system which may be manually controlled in a step-by-step manner by gradual operation of the master controller through a series of positions, while the normal operation of the system may be made fully automatic by immediately throwing the master controller to a final position. In addition, a different type of automatic operation, entirely independent of the limit switch, to any selected step is accomplished by the use of a materially smaller number of "progression" control conductors than the number of movements of the main controller. Such a combination of selective, independent manual and automatic control systems has never before been devised, so far as I am aware.

I do not wish to be restricted to the specific circuit connections or arrangement of parts herein set forth, as various modifications thereof may be made without departing from the spirit and scope of my invention. I desire, therefore, that only such limitations shall be imposed as are indicated in the appended claims.

I claim as my invention:

1. In a system of control, the combination with a dynamo-electric machine and a plurality of operating circuits therefor, of single means having one part connected for effecting a manual step-by-step operation of the machine and another part connected for automatically effecting a similar normal operation.

2. In a system of control, the combination with an electric motor and means for adjusting the motor circuits, of single manually-controlled means having one part adapted to effect acceleration of said motor step-by-step and having another part adapted to automatically effect a normal acceleration.

3. In a system of control, the combination with an electric motor and means for adjusting the motor circuits, of multi-position means for effecting acceleration of said motor step-by-step as said means occupies successive positions or for automatically effecting a normal acceleration when said means is actuated to a different position.

4. In a system of control, the combination with an electric motor and means for adjusting the motor circuits, of multi-position means for effecting complete acceleration of said motor step-by-step as said means occupies successive positions or for automatically effecting a normal acceleration when said means is rapidly actuated through said successive positions to a final position.

5. In a system of control, the combination with an electric motor and means for adjusting the motor circuits, of a master controller for effecting complete acceleration of said motor step-by-step as the controller occupies successive positions or for automatically effecting a complete normal acceleration when the controller is rapidly actuated through said successive positions to a final position.

6. In a system of control, the combination with a dynamo-electric machine and main means for adjusting the machine circuits a predetermined number of times to effect complete machine operation, of auxiliary governing means for said main means embodying a materially smaller number of "progression" control conductors than said number of times.

7. In a system of control, the combination with a dynamo-electric machine and main means for adjusting the machine circuits a predetermined number of times to effect complete machine operation, of auxiliary governing means for said main means embodying a materially smaller number of "progression" control conductors than said number of times, and adapted to effect automatic machine operation to any selected point.

8. In a system of control, the combination with a dynamo-electric machine and main means for adjusting the machine circuits a predetermined number of times to effect complete machine operation, of auxiliary governing means for said main means embodying a materially smaller number of "progression" control conductors than said number of times and adapted to manually effect step-by-step operation of said main means or to effect automatic machine operation to any selected step.

9. In a system of control, the combination with an electric motor and a main circuit-adjusting controller having a certain number of operative positions, of a limit switch, and a master controller for effecting the actuation of the main controller step-by-step or for effecting automatic main-controller operation, independently of said limit switch, to any selected step, said master controller embodying a materially smaller number of "progression" control conductors than said number of positions.

10. In a system of control, the combination with a dynamo-electric machine and a plurality of operating circuits therefor, of means for effecting a full automatic operation of said machine through a plurality of circuit connections, and means independent of such automatic means for effecting a selective automatic operation to any set of circuit connections.

11. In a system of control, the combination with an electric motor, of means for effecting automatic motor operation to a predetermined point, and means independent of such automatic means for effecting automatic operation to another point.

12. In a system of control, the combination with an electric motor and means for adjusting the motor circuits, of a limit switch, controlling means acting in conjunction with said limit switch to effect automatic operation of said circuit-adjusting means to a predetermined point and acting independently of the limit switch to effect selective automatic operation to any other operating point.

13. In a system of control, the combination with an electric motor and means for adjusting the motor circuits, of a limit switch, controlling means acting in conjunction with said limit switch to effect full and automatic operation of said circuit-adjusting means and acting independently of the limit switch to effect selective automatic operation to any intermediate operating point.

14. In a system of control, the combination with an electric motor and a main-circuit-adjusting controller having a certain number of operative positions, of a limit switch, and a master controller for effecting the actuation of the main controller to the final operating position in conjunction with the limit switch or for automatically effecting the actuation of the main controller to any selected step independently of the limit switch, said master controller embodying a materially smaller number of "progression" control conductors for use in said selective automatic acceleration than said number of positions.

15. In a system of control, the combination with an electric motor, of means for effecting a manual step-by-step operation of the machine, full automatic acceleration thereof, or automatic operation to any selected point independently of the full automatic means.

16. In a system of control, the combination with an electric motor and means for adjusting the motor circuits, of a limit switch, controlling means acting in conjunction with said limit switch to effect full automatic operation of said circuit-adjusting means and acting independently of the limit switch to effect selective automatic operation to any intermediate operating point, said controlling means being also adapted to effect a straight manual step-by-step operation of the motor.

17. In a system of control, the combination with an electric motor and a main-circuit-adjusting controller having a certain number of operative positions, of a limit switch, and a master controller for effecting the actuation of the main controller to the final operating position in conjunction with the limit switch or for automatically effecting the actuation of the main controller to any selected step independently of the limit switch, said master controller embodying a materially smaller number of "progression" control conductors for use in said selective automatic acceleration than said number of positions, or for effecting a straight manual step-by-step operation of the motor.

18. In a system of control, the combination with an electric motor and a main-circuit-adjusting controller having a certain number of operative positions, of a limit switch, and a master controller for effecting the actuation of the main controller to the final operating position in conjunction with the limit switch or for automatically effecting the actuation of the main controller to any selected step independently of said limit switch at all times and in conjunction with position-locating contact members on the main controller.

19. In a system of control, the combination with an electric motor and a main-circuit-adjusting controller having a certain number of operative positions, of a limit switch, and a master controller for effecting the actuation of the main controller to the final operating position in conjunction with the limit switch or for automatically effecting the actuation of the main controller to any selected step in conjunction with position-locating contact members on the main controller, said master controller embodying a materially smaller number of "progression" control conductors for use with said contact members than said number of positions.

In testimony whereof, I have hereunto subscribed my name this 25th day of Sept., 1918.

PAUL L. MARDIS.